Feb. 6, 1940.  C. O. LAVETT  2,188,907
DRYING SOLUTIONS CONTAINING LACTOSE
Filed July 8, 1937
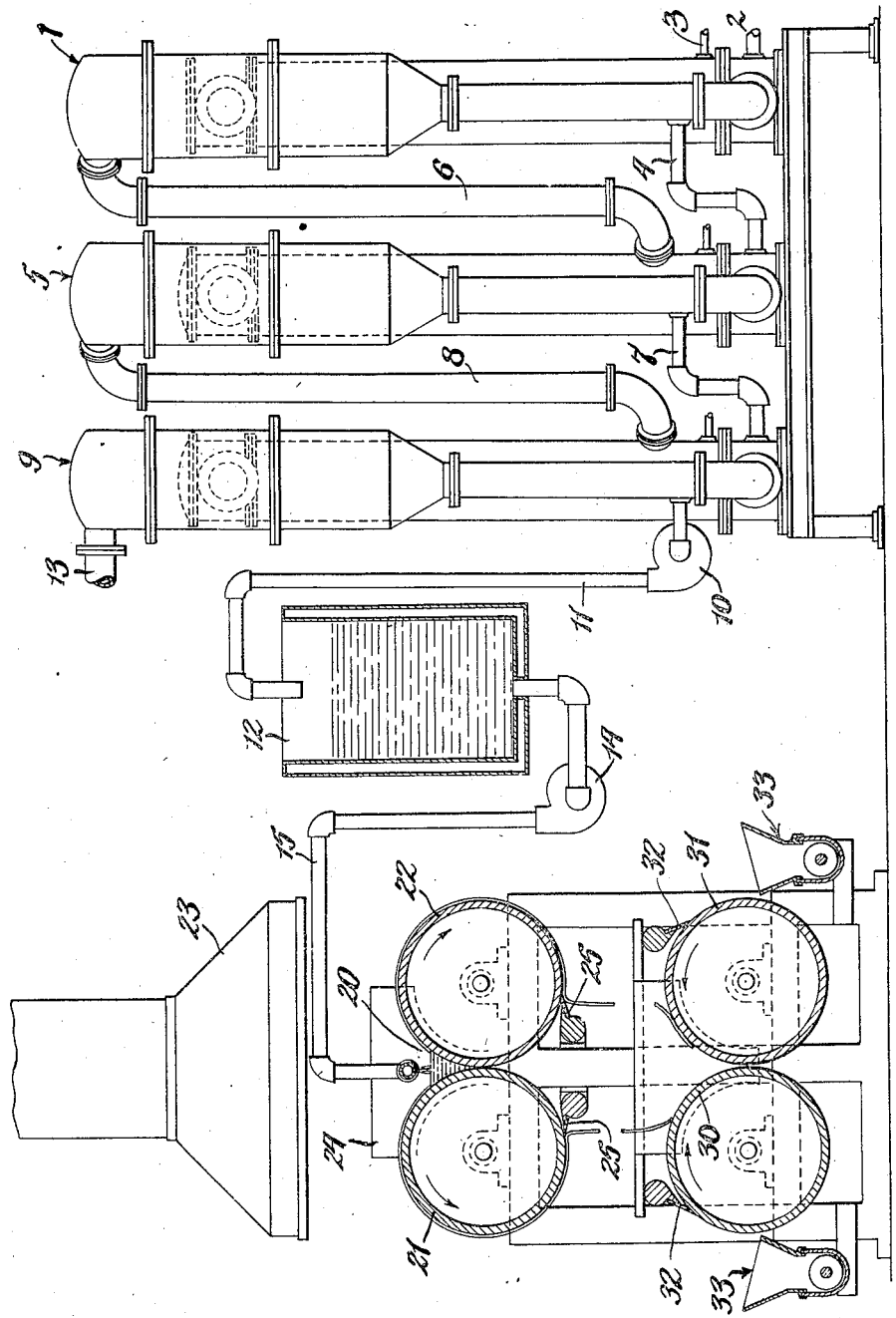
Inventor
Charles O. Lavett
by Pope and Pope
Attorneys Patented Feb. 6, 1940

2,188,907

UNITED STATES PATENT OFFICE 2,188,907

DRYING SOLUTIONS CONTAINING LACTOSE

Charles O. Lavett, Buffalo, N. Y., assignor to Buffalo Foundry & Machine Co., Buffalo, N. Y., a corporation of New York Application July 8, 1937, Serial No. 152,616

10 Claims. (Cl. 99—57)

This invention relates to drying of solutions containing lactose including also solutions containing other solids but in which a preponderance of the solids is lactose. Such solutions may be very dilute and may contain proteins, mineral salts, and other constituents, an example of dilute solutions containing lactose and other solids being whey which is the residue remaining after casein has been removed from skimmed milk in the manufacture of casein or cottage cheese, or remaining after fat and casein have been removed from whole milk in the manufacture of cheese.

This application is a continuation in part of my application, Serial No. 45,091, filed October 15, 1935.

A principal object of the present invention is to provide a low-cost, high-capacity, continuous, and rapid process for drying solutions in which lactose comprises substantially all or in any event a preponderance of the solids present, and which can be carried out with relatively inexpensive and compact equipment and which produces a stable, non-caking palatable, undiscolored, readily soluble, and dry product. Other objects and advantages will appear from the following description of the invention.

Certain facts concerning lactose have been published. Lactose in solution is in both alpha and beta forms, the relative proportions of which are more or less definitely fixed by a tendency toward equilibrium, e. g., published proportions vary from 61.3% beta to 38.7% alpha lactose at 77° F. to 57.1% beta to 42.9% alpha lactose at 212° F. Crystals formed from a solution at temperatures stated to be above 199.4° F. tend to be in beta form and those that form at lower temperatures tend to be in alpha form. When crystals of one form are formed equilibrium of the lactose remaining in solution tends to be reestablished by conversion of one form to the other, e. g., when beta crystals form alpha lactose still in solution is converted to beta lactose in solution to replace the beta lactose removed from the solution by crystallization. However, such conversion apparently requires time and the presence of water. Lactose that has crystallized from a solution, depending upon the temperature conditions under which it is crystallized and depending upon other conditions existing during the crystallization, such as the amount of water present, the length of time during which crystallization is proceeding, and the nature of other solids present, may be in the beta form in which the crystals do not require or carry any water of crystallization or in the alpha form in which the crystals are hydrated in that they carry a definite proportion of water of crystallization. Moreover, dry lactose may exist without being crystallized, and in such case the lactose tends to attract moisture.

In the practice of this invention the lactose and other constituents present in the final product are in such form that, while the final product may take on and give off moisture under changing conditions of humidity, it does not take on moisture to such extent as to cause the product to cake or become sticky, and the lactose is not discolored or has not suffered such discoloration as undesirably to impair the color of the product, dried whey made in accordance with this invention being stable, non-caking, readily soluble, palatable and of a cream color. Tests of the product show that it contains beta lactose in crystalline form and that the lactose present is largely, in some cases up to about 88%, in beta form. It is believed that the presence of the crystalline beta lactose and the high concentration of beta lactose in the final product are largely responsible for the non-caking character of the dry product.

In the practice of this invention, the several features thereof, which may be used in conjunction or separately, are directed to causing the dried product to possess the above stated characteristics. Features of this invention are that in the final drying that is effected by heat, the heat is supplied at a temperature above that ordinarily recognized as the temperature above which beta lactose crystallizes and, when the concentration of solids is such that a seeding agent will be effective to promote crystallization, the material being dried is brought into contact with a seeding agent. Further features of this invention are that the hot concentrated material is worked as beta lactose seeding crystals are brought in contact therewith; that the supply of beta lactose seeding crystals is effected automatically; that some of the finally dried material containing such crystals is used as the source of beta lactose seeding crystals; and that drying of the material seeded with beta lactose crystals occurs simultaneously with the formation and growth of beta lactose crystals.

To facilitate the embodiment of these features in the practice of this invention, further features of my invention, which may be used conjointly or separately, are that the material, while at a temperature that promotes the formation of beta lactose crystals and while sufficiently concentrated that seeding crystals supplied thereto will be effective, is fed in the presence of beta lactose crystals to a revolving surface which preferably is in the form of a pair of internally-heated rolls rotating in close relation on parallel axes; that the material is fed in the presence of those crystals to a point on said rolls near and moving toward the bite or point of closest approach of those rolls and is spread or worked into a thin layer as it is passed through the bite; that the seeded material divides into two continuous thinner layers respectively adhering to the rolls after the material passes through the bite; that the formation of crystals, an effect which involves a time element, continues simultaneously with the drying that is due to the supply of heat from the interior of the rolls which is at a temperature above that at which it is commonly understood that alpha lactose crystallizes; that the material is retained on the drums until the moisture content is reduced to provide the above desirable characteristics in the final product; and that when the material is removed from the rolls there is left adhering to the surface thereof sufficient dry material containing beta lactose crystals effectively to seed the hot concentrated material that is fed to the rolls and is thereby passed to and worked in the bite, the seeding of hot concentrated material with beta crystals from an earlier stage of the drying operation being thus automatically effected.

Actual use of this invention indicates that lactose-containing solutions having not substantially less than 60% of solids and at a temperature favoring crystallization of lactose in beta form can be readily seeded by the introduction of beta-lactose crystals and that too high a concentration imposes undesirable mechanical stress upon the drum-drying means above mentioned, although effective seeding, crystallization, and drying of solutions containing 35% to 93% of solids can be carried out. To obtain solutions having a concentration of solids not substantially less than 60%, it is necessary to effect a concentration of such lactose-containing solutions as are ordinarily available, e. g., whey, which contains in the neighborhood of 6% solids, all percentages herein stated being on the basis of weight.

Preconcentration of dilute lactose-containing solutions can be effected in vacuum evaporators up to a concentration of 65%–70% of solids, but only by concentrating in batches in a single-effect vacuum pan and only with the difficulties that the heating surfaces become badly coated and evaporation is slow because of this coating and the high viscosity of the fluid, thereby requiring large heating surfaces and close supervision of the operation. On the other hand, a solution containing 30%–50% of solids can be obtained readily in any one of various ways, and a continuous supply can be obtained from a multiple-effect evaporator, but a solution with such concentration of solids is difficult to seed effectively with beta lactose crystals because of the tendency of such a solution to dissolve the crystals added for seeding purposes.

It is a feature of this invention, which contributes to the possibility of its being a continuous process and which cooperates advantageously with the seeding, crystallizing and drying operation above described, that there is an intermediate concentration between continuous concentration, as in a multiple-effect evaporator, and the seeding, crystallizing and final drying operation. Although the concentration preceding the seeding need not necessarily be effected by vacuum evaporation and such intermediate concentration, the best practice of this invention includes those features. Since lactose has a limited solubility and whey contains proteins which increase the viscosity of the whey at higher concentration, it is especially advantageous in the drying of whey to limit the initial concentration of whey under vacuum to a point at which the concentrate is free flowing and easy to handle and does not deposit lactose crystals, especially if kept warm. At such concentration the drying operation is sensitive to slight changes of concentration, temperature and operating conditions and an intermediate concentrating step facilitates control and ensures more uniform result and removes the danger of rendering inoperative the coating of seeding crystals on the final drying drums.

It is a further feature of this invention that the intermediate concentrating step which raises the concentration from that readily and desirably effected by a multiple-effect evaporator to that required for effective evaporation on the final drying rolls, may take the form of a revolving heated surface, preferably a pair of internally-heated rolls rotating in contact or close relation on parallel axes in a horizontal plane, the surfaces of the rolls moving upwardly at the bite. Such a double-drum type of concentrating means is preferred because time for effecting desired concentration should be short; the concentration is effected at high temperature and in layers and rapidly, and without separating of lactose crystals; the viscous concentrated material can be delivered to the final drying and crystallizing drums at a temperature close to its boiling point and merely by gravity inasmuch as the concentrating drums are preferably placed above the final drying drums, the concentrate being automatically distributed over the entire surface of the lower drums by the working of the material in the bite thereof; and the intermediate concentration can be coordinated and synchronized with the operation of the lower drums inasmuch as the quantity and concentration of material leaving the upper drums can be regulated by adjusting steam pressure therein and speed of rotation thereof.

An important feature of the invention is that by effecting the intermediate concentration by the double-drum means the light color of whey is preserved by reason of the rapidity of the concentration. Preferably the concentrate is cleanly removed from the surfaces of the intermediate drums. An advantageous feature of the intermediate or concentrating drums is that their surfaces move upwardly at the bite permitting better control of the concentrating step and permitting transfer of the concentrate to the lower drums by gravity without any mechanical device, and permitting all of the solution which adheres to the upper drums to remain in undisturbed condition until removed therefrom and carried by gravity to the lower drums, and permitting a layer of greater thickness to be handled on the upper drums than could be handled if they rotated in an opposite direction and the clearance between them, sufficiently small to prevent any of the fluid material in the trough between the drums from falling therebetween, determined the thickness of the layer of material that would then be divided into two thin layers adhering respectively to the two drums. The withdrawal of such thin layers from the trough or valley between the drums would result in an undesirable holding of the material therein and undesirable concentration thereof, and the resulting thin layers would be liable to bake or burn and impair the color of the final product or to be raised to too high a concentration for easy handling by the lower drums. Inasmuch as the surfaces of the concentrating rolls move upwardly at the bite the thickness of the film on the rolls is the full thickness of the film that will be carried out of the trough by adherence to the surfaces of the rolls. That thickness will depend upon the properties of the material that is being withdrawn from the trough between the rolls as films upon the surfaces of the rolls. The relation of rate of feed to the trough to the rate of withdrawal therefrom is important to maintain the proper level in the trough and the desired film thickness. The film should not be so thin that it is likely to be burned or scorched on the rolls and it should not be so thick that the body of the material in the film is too great for proper concentration before the material is passed on to the lower rolls.

Up to the time that the material is carried between the lower set of rolls no crystallization takes place therein, and, consequently, no crystallization has taken place in the material leaving the upper rolls. If any crystallization has occurred in the material being fed to the upper rolls, as by reason of allowing the material to cool before being fed to the upper rolls, such crystals are dissolved when the material is heated in the trough between the upper rolls. The absence of crystallization of the material prior to the passing of the material through the bite of the lower rolls has been shown by analysis of samples of viscous material leaving the upper drums and also the viscous material which has fallen to the lower drums but has not yet passed through the bite thereof. Such samples show that beta and alpha lactose are present therein approximately in the proportion of 60—40, which is the approximate proportion existing in the original lactose solution. The material leaving the upper drums is a viscous material and free from the grittiness that would indicate the presence of crystals therein. Seeding tests made with solutions of pure lactose showed the absence of either alpha or beta lactose crystals prior to the passing of the material through the bite of the lower drums.

The effectiveness of the automatic seeding of the material on the lower drums is indicated in various ways. When the process is first put into operation, and the temperatures are all maintained above 199.4° F., there is no coating of seeding crystals on the lower drums, but crystallization sets in after a short time and so long as an effective coating of seeding crystals is left on the lower drums by proper setting of the knives that remove the dried material therefrom, effective crystallization and drying occur without discoloration and the final product has the desirable properties above stated. If the seeding crystals are removed from the lower drums the production of insufficiently crystalline material will occur until the coating of seeding crystals is again built up.

In the operation of this process the action of the concentrating drums and of the crystallizing and drying drums must be coordinated. In addition to having the material that passes from the upper drums to the lower drums so concentrated that the seeding will be effective and sufficient crystallizing and drying will result, the operating conditions must be such that there is no undue accumulation of material in the bite between the lower drums because there is then a tendency to darken the product which becomes more pronounced as such accumulation increases. Undue accumulation can be avoided by adjusting the rate of feed to the upper drums, the rate of rotation thereof, and their temperature. Insufficient concentration on the upper drums, especially with such an excessive accumulation, will impose difficulty upon the maintaining of the layer of seeding crystals in that there will be a tendency to dissolve those crystals. Preferably, the concentration of solids in the material passing to the lower drums will be between 66% and 93%, since material of such concentration lends itself to the seeding operation and while it drops to the lower drums in patches those patches can be readily spread throughout the surfaces of the lower drums by passing the material through the bite of the lower drums.

The proportion of beta lactose in the final product can be varied by adjusting the temperature of the lower drums and the speed thereof, a lowering of the speed or of the temperature and the speed increasing the beta lactose proportion. A preponderance of the lactose in the final product is definitely crystalline and in beta form. Use of the final product as a seeding agent for a pure lactose solution indicates that alpha lactose present in the final product is probably not crystalline. However, as above stated, the final product of the invention, especially including dried whey, does not attract sufficient moisture to cause it to cake and it is stable and readily soluble, showing that the proportion of beta lactose is high and that such alpha lactose in amorphous form as may be present is present under such conditions as not to impair the stability and non-caking character of the product.

It will be apparent from the foregoing that the dried product of lactose-containing solutions, in which lactose constitutes a major portion of the solids present, is efficiently produced; that the dividing of the procedure between a concentrating step and a crystallizing and drying step permits of the effective seeding of the product at a time when it is effective; that the seeding may be automatically effected without recycling of any substantial proportions of the finished product, which recycling would impair the economy of the procedure; that the handling of the material when in the viscous state is simplified to a maximum degree; that difficulties inherent in attaining a high concentration in vacuum pans are avoided; and that the process is continuous and involves little equipment and causes the amount of material in process at any time to be at a minimum.

As above indicated, the process is particularly adapted to and effective in the drying of whey, an operation which involves special difficulties due to the dilute character of the raw material, the presence of protein, mineral salts, and acids due to fermentation of the milk or to the addition of acid for the precipitation of casein. Raw whey contains only 6% of solids of which 60%–75% is lactose and 40%–25% is albumin, mineral salts and free acids, the respective percentages and natures of which vary considerably with the source of milk and the procedure by which the whey is produced as a by-product. In efforts to dry whey by a continuous operation the features of the procedure whereby continuous operation is sought have caused difficulties to arise which are met and overcome by this invention. As above pointed out, the high viscosity of concentrated whey solutions has caused difficulties in producing and handling whey solutions of high viscosity and those difficulties are overcome by procedure in accordance with this invention. Moreover, the presence of albumin in the whey is likely to cause failure of proper heat transmission, local over-heating and discoloration, in the layer on the concentrating rolls and prevent proper control of concentration unless the albumin is previously coagulated. Accordingly, in the practice of this invention whey to be dried is preferably heated by passage through a heater (not shown) that will sufficiently coagulate the albumin and prevent such difficulty. Such treatment is preferably applied to the whey prior to the initial concentration thereof.

Inasmuch as whey from different sources varies in composition it may be desirable to adjust the acidity thereof to facilitate drying and to obtain a light colored product and a higher capacity. In practice, however, it has been found that whey remaining after precipitation of casein by means of mineral acid is readily reduced to dry material in the practice of the invention when the acidity thereof is approximately 0.4% (calculated as lactic acid) especially when the mineral acid is sulfuric acid. Whey produced in the manufacture of cheese or rennet casein is readily dried by the practice of the invention, especially if the acidity thereof is brought to approximately 0.4% (calculated as lactic acid) by a slight addition of sulfuric acid. Sour whey, such as produced in the manufacture of cottage cheese or lactic acid casein or such as results from the souring of whey otherwise produced is readily dried in the practice of the invention especially if it is at least partly neutralized by the addition of lime and then its acidity is brought up to approximately 0.4% (calculated as lactic acid) by the addition of sulfuric acid. In the case of sour whey, partial neutralization and addition of sodium bisulfite also has been found beneficial in combination with concentration on the upper drums to above 90%.

Whey dried in accordance with this invention has all the desirable properties above stated as the properties of the final product of the process. Such dried whey may contain as high as 5% of moisture and it will be stable, the beta lactose not being reconverted into an alpha hydrate. Samples of casein whey dried in accordance with this process and analyzed after standing three months showed practically the same content of beta lactose as when first produced. On very humid days, if exposed to the atmosphere, the dried whey will absorb some moisture and at low humidities will give up the moisture to the atmosphere.

Analyses of whey samples produced in accordance with this invention are as follows:

|  | Casein whey | Rennet whey | Cottage cheese whey | Overall |
| --- | --- | --- | --- | --- |
|  | Percent | Percent | Percent | Percent |
| Lactose, anhydrous | 64–69 | 70–76 | 61–65 | 60–76 |
| Protein | 10–14 | 10–15 | 10–14 | 10–15 |
| Mineral ash | 10–12 | 7–9 | 10–13 | 7–13 |
| Acid, as lactic acid | 6–8 | 1.5–2.5 | 5.5–9 | 1.5–9 |

If the free acid is partly neutralized the mineral ash may go up to 15% and the acid, calculated as lactic acid, may go down to 1–2%. The beta lactose is from 75–90% of the total lactose.

Further features of this invention and specific details of the operation thereof appear in the following description of an illustrative example of apparatus suitable for the practice thereof, in connection with which an illustrative example of operation is given.

In drying raw whey, or other solutions containing uncoagulated protein, it is desirable to first coagulate the protein. This can be done by heating the solution, preferably in a heater (not shown) through which the whey is rapidly recirculated so as to reduce the tendency of coating the heating surfaces in the evaporator with protein.

As the first step of the concentrating process it is preferable to first preconcentrate the dilute whey in any suitable manner to from 30–50% solids. For this preconcentration I prefer to employ a multiple effect vacuum evaporator, although it will be understood that any other apparatus can be used. In the multiple effect evaporator shown the whey is admitted to the first effect 1 at 2 and the steam at 3. From this first effect, the concentrated material passes through a line 4 to a second effect 5 and the vapors pass off through a line 6 to heat the materials in the second effect. Similarly, the further concentrated materials from the second effect pass through a line 7 and the vapors through a line 8 to the third effect 9. From the third effect the materials are withdrawn by a pump 10 and discharged through a line 11 into a steam jacketed storage tank 12, this tank being preferably so heated to prevent the formation of crystals and to prevent the material from the multiple effect evaporator from cooling down. The vapors from the third effect pass out through an outlet 13 which is connected with a steam ejector and barometric condenser (not shown) or the like so that evaporation in the several effects takes place at reduced pressure. Preferably a vacuum of 25 or 26 inches is maintained in the last effect 9.

At a concentration of 30–50% solids the liquid is smooth and flows freely without any sign of crystal formation and is in condition for drum drying as hereinafter set forth. From the storage tank the preconcentrated whey is passed by a pump 14 through a line 15 and is deposited in the space 20 between a pair of heated drums 21 and 22. These drums form part of an atmospheric dryer, the vapor being drawn off through a hood 23. The drums 21 and 22 have the usual end boards 24 for retaining a quantity of the whey in the space or valley 20 and it will particularly be noted that the drums 21 and 22 rotate in a direction opposite to the direction of rotation of the drums in the usual double drum dryer, i. e., the drums 21 and 22 move upwardly at their point of closest approach. The quantity of the whey in the space or valley 20 is purposely fed at such low concentration (30–50% solids) so that it is maintained in a liquid state in this space and free from any crystals. This body of whey boils and some of the water is evaporated during this boiling. The quantity of liquid in the space 20 is maintained at a proper level required to deposit the proper amount of material on the drum surface. The temperature of the material fed to the boiling liquid between these drums is almost instantly raised to its boiling point.

At the concentration effected by the preconcentration of the whey and its boiling in the space 20, the drums 21 and 22, rotating upwardly at their point of closest approach, pick up a heavy thick layer of the boiling solution, these layers being very much thicker than those which would be obtained if the drums were rotated in the opposite direction.

The thick layers on the surfaces of the drums 21 and 22 are quickly reduced to any desired moisture content governed by the density of the solution fed, the steam pressure and the speed of the drums. In drying whey the concentration effected on the upper drums 21 and 22 can be in a range varying from 35 to 93% concentration, but best results are obtained at a more elevated concentration within this range (72-93%) depending on the nature of the whey to be dried. The drums 21 and 22 are preferably rotated at such speed that the thick layers are retained on the drums for 20-60 seconds and the steam pressure is preferably maintained at 15-60 pounds gage or at from 250-307° F. The thick layers on the upper drums 21 and 22 are removed by doctor knives 25 in the form of a very viscous material which drops at a temperature close to its boiling point in patches or strips onto the lower set of drums 30, 31.

The viscous material so removed from the upper set of drums in strips spreads out somewhat and forms patches on the lower set of drums, these patches remaining soft as they are being carried to the bite of the drums. This viscous material contains so much water that the heat remaining in the strips removed by the knives 25 is insufficient to dry the viscous material. The drums 30 and 31 rotate in the direction reverse of the drums 21 and 22, i. e., the drums 30 and 31 travel downwardly at their bite so that the deposited patches are united and pressed between the drums, emerging on the underside of each drum as a heavy layer which can be dried to any desired degree of dryness. The dried material is removed from the lower set of drums 30 and 31 by knives 32 located on opposite sides of the drums and which deposit the product in sheet or granular form, in screw conveyers 33 or the like.

The steam pressure and speed of the lower drums 30 and 31 are of primary importance in carrying out the process, these factors being mutually dependent to an extent, higher steam pressure permitting a higher drum speed. In drying whey best results were obtained with steam between 15 and 40 pounds gage pressure in the lower drums (250-287° F.). Below 15 pounds pressure the drum speed has to be reduced to such an extent that the drying process becomes uneconomical. Above 40 pounds gage whey has a tendency to become discolored depending on the degree of acidity and nature of the other ingredients present. Within this range of steam pressure, a drum speed allowing a contact period of 20-80 seconds between the point of application of the coating to the drum surface at the bite and the point of removal by the doctor knives 32 can be employed. The material removed by the knives 32 preferably contains from 1.5-5% moisture. This moisture content may be varied, as desired, by increasing or decreasing the clearance between the drums 30, 31 or by varying the steam pressure or drum speed. Actual steam pressure and time of contact allowed with both sets of drums is regulated to correspond to the nature of the lactose solution, because such solutions from different sources and at different times exhibit a marked difference in its properties and behavior. For this reason, the steam pressure and time of contact may on occasion require or permit modification in either direction and for either set of drums.

Up to the time that the material is carried between the lower set of drums, no crystallization takes place. Crystallization takes place on the lower set of drums simultaneously with drying due to the presence of seed crystals on the drum surface. Without the presence of an effective layer of seed crystals on the drums the final product is soft at the knives 32 regardless of the concentration of the material fed to the lower drums. This coating of seed crystals is provided by setting the knives 32 in such a way that the dry material is not entirely removed. If these knives are set with too great pressure against the drum surfaces so that the entire layer of dried whey is removed and no seeding layer left, the product becomes soft.

Under the condition set forth with the temperature of the lower drums well above 199.4° F., if no seeding layer is initially present on the lower drums, a seeding layer of beta crystals will build up on the lower drums. At the start of operations where the lower drums have been washed and have no residual coating of seeding crystals the product for a number of rotations of these drums is not sufficiently crystallized at the knives 32. Since the drums are, however, under the operating conditions assumed, maintained at a temperature above the transition point in forming alpha and beta lactose, a residual coating of beta lactose seed crystals builds up on the lower drums, the knives 32 being deliberately adjusted to leave this residual coating.

Since the maintenance of a seeding layer of crystals on the lower drums is important to proper crystallization, the concentration and temperature of the material applied to the lower drums is important. It is always desirable that this temperature be as close to the boiling point as possible. Although I have dried whey when applied to the lower drums at a concentration as low as 35% and as high as 93%, it is not desirable to drop the concentration below the point at which the coating of seed crystals becomes difficult to maintain, the high moisture content having a tendency to dissolve the seed crystals especially where an accumulation of materials occurs between the lower drums as the crystals partly dissolve in the feed liquor. A concentration higher than 93% is also not recommended because the patches do not spread so well when passing between the drums and cannot be pressed into a uniform coating. At too high a concentration the material deposited on the lower drums will no longer crystallize and severely strains the drums and bearings.

By "heated at a temperature" as used with reference to the drums in the following claims is meant the temperatures obtained by introducing steam into standard drying drums at the temperature set forth, it being recognized that there is, in drying drums, a very substantial difference between the steam temperature and the outside surface temperature, and it being also recognized that the drums could be heated by electricity or media other than steam.

From the foregoing it is apparent that the present invention provides a continuous, rapid and low cost process for reducing lactose solutions to a light colored, dry, stable and uniform product. While I have described specific apparatus for carrying out my process, other apparatus could be used and therefore the invention is not to be limited to the use of any particular apparatus or steps but is to be accorded the full range of equivalents comprehended by the accompanying claims. In particular, the preconcentrating and intermediate concentration steps could be accomplished by means other than the multiple effect evaporator and the upper pair of drums shown.

I claim as my invention:

1. The process which comprises producing a heavily concentrated solution containing solids a preponderance of which is lactose, said solution being of such heavy concentration as to prevent free movement of seed crystals therethrough, seeding a heated surface with lactose crystals and spreading the concentrated solution in the form of a layer on said seeded and heated surface to effect simultaneous drying of said layer and crystallization of the lactose in solution.

2. The process which comprises heating a solution containing solids a preponderance of which is lactose at a temperature considerably above 212° F. to effect rapid concentration to approximately 66–93% solids, said solution being of such heavy concentration as to prevent free movement of seed crystals therethrough, seeding a heated surface with lactose crystals, spreading said concentrated solution in the form of a layer on said seeded and heated surface and drying said layer on said heated surface simultaneously with the crystallization of the lactose in solution.

3. The process which comprises heating whey at a temperature considerably above 212° F. to effect rapid concentration to approximately 66–93% solids, spreading said concentrated solution in the form of a layer on a surface seeded with crystalline beta lactose and heated to a temperature of 250–287° F. and retaining said layer on said seeded surface for from 20–80 seconds to reduce the moisture content of said solution to less than 5%.

4. The process which comprises concentrating whey, said whey being of such heavy concentration as to prevent free movement of seed crystals therethrough, spreading the concentrated whey in the form of a layer on a revolving heated surface, and incompletely removing said layer when dried to leave a coating on said heated surface containing dry crystalline lactose serving as seed crystals for the concentrated whey so applied whereby drying of said layer and crystallization of said lactose proceeds simultaneously.

5. The process which comprises concentrating a solution containing solids a preponderance of which is lactose, spreading said solution in the form of a layer on a revolving surface heated at a temperature of from 250–287° F., retaining said layer on said surface for from 20 to 80 seconds to reduce the moisture content of said layer to less than 5%, and incompletely removing said layer when dried to leave a coating on said heated surface containing crystalline lactose serving as seed crystals for the concentrated solution applied to said surface, the concentration of the solution so applied being sufficiently high as not to remove the layer of seeding material from said surface.

6. The process which comprises preconcentrating under vacuum a solution containing solids a preponderance of which is lactose to approximately 30–50% solids, said solution being of such heavy concentration as to prevent free movement of seed crystals therethrough, subjecting said preconcentrated solution to an intermediate concentration by heat applied at a temperature of from 250–307° F. for from 20 to 60 seconds and subjecting said solution to a final drying treatment at a temperature above 199.4° F. for from 20–80 seconds on a surface seeded with crystalline beta lactose to reduce the moisture content of said solution to less than 5%.

7. The process which comprises preconcentrating a solution containing solids a preponderance of which is lactose to approximately 30–50% solids, spreading said preconcentrated solution in the form of a layer on a surface heated at a temperature of from 250–307° F., retaining said layer on said heated surface for from 20–60 seconds, transferring said solution to a second surface seeded with crystalline beta lactose and heated to maintain the temperature of said solution above 199.4° F., spreading said solution on said second surface and retaining said spread solution on said second surface for from 20–80 seconds to reduce the moisture content of said solution to less than 5%.

8. The process which comprises evaporating a solution containing solids a preponderance of which is lactose rapidly in the form of a layer on a heated metal surface at a temperature considerably above 212° F. and for such length of time that the layer will, at the time of removal from the heated surface, be substantially in the form of a viscous material and contain so much water that the heat remaining in the layer is insufficient to dry the viscous material, said layer being of such heavy concentration as to prevent free movement of seed crystals therethrough, removing said viscous material from the heated surface, passing said removed viscous material to a second heated surface seeded with crystalline beta lactose, spreading said viscous material on the second heated surface, further evaporating water from the viscous material on said second surface and removing the material from said second heated surface.

9. The process which comprises producing a heavily concentrated solution containing solids, a preponderance of which is lactose, said solution being of such heavy concentration as to prevent free movement of seed crystals therethrough, seeding a heated surface with beta lactose crystals and spreading the concentrated solution in the form of a layer on said seeded and heated surface to effect simultaneous drying of said layer and crystallization of the lactose in solution in the form of the beta anhydride.

10. The process which comprises concentrating whey, said whey being of such heavy concentration as to prevent free movement of seed crystals therethrough, spreading the concentrated whey in the form of a layer on a revolving heated surface to effect crystallization of the lactose in the form of the beta anhydride and incompletely removing said layer when dried to leave a coating on said heated surface containing dry crystalline beta lactose serving as seed crystals for the concentrated whey so applied whereby drying of said layer and crystallization of said lactose proceeds simultaneously.

CHARLES O. LAVETT.